(12) United States Patent  (10) Patent No.: US 8,453,440 B2
Busch  (45) Date of Patent: Jun. 4, 2013

(54) DRIVE DEVICE FOR A VEHICLE

(75) Inventor: Jörg Busch, Königsbronn-Zang (DE)

(73) Assignee: Voith Patent GmbH, Heidenheim (DE)

( * ) Notice: Subject to any disclaimer, the term of this patent is extended or adjusted under 35 U.S.C. 154(b) by 895 days.

(21) Appl. No.: 12/472,773

(22) Filed: May 27, 2009

(65) Prior Publication Data
US 2009/0308064 A1   Dec. 17, 2009

(30) Foreign Application Priority Data

Jun. 12, 2008 (DE) .................. 10 2008 027 947

(51) Int. Cl.
F16H 41/30 (2006.01)
F16H 41/00 (2006.01)
(52) U.S. Cl.
USPC ............................................. 60/337; 92/144

(58) Field of Classification Search
USPC ................................................ 60/337; 92/144
See application file for complete search history.

(56) References Cited

U.S. PATENT DOCUMENTS 3,749,209 A * 7/1973 Weinrich et al. ............. 188/291
2007/0033931 A1* 2/2007 Scherer et al. ................. 60/337

FOREIGN PATENT DOCUMENTS

DE 2 021 543 11/1971

* cited by examiner

Primary Examiner — Thomas E Lazo
(74) Attorney, Agent, or Firm — Faegre Baker Daniels LLP

(57) ABSTRACT

A drive device for a vehicle having an automatic transmission, which has a hydrodynamic torque converter. The transmission oil of the automatic transmission is used as the operating medium for the hydrodynamic torque converter. In addition, the drive device has a heat exchanger for cooling the operating medium. It is provided that additional apparatuses (heat exchangers) are provided for the direct cooling of the hydrodynamic torque converter using a cooling medium.

20 Claims, 1 Drawing Sheet

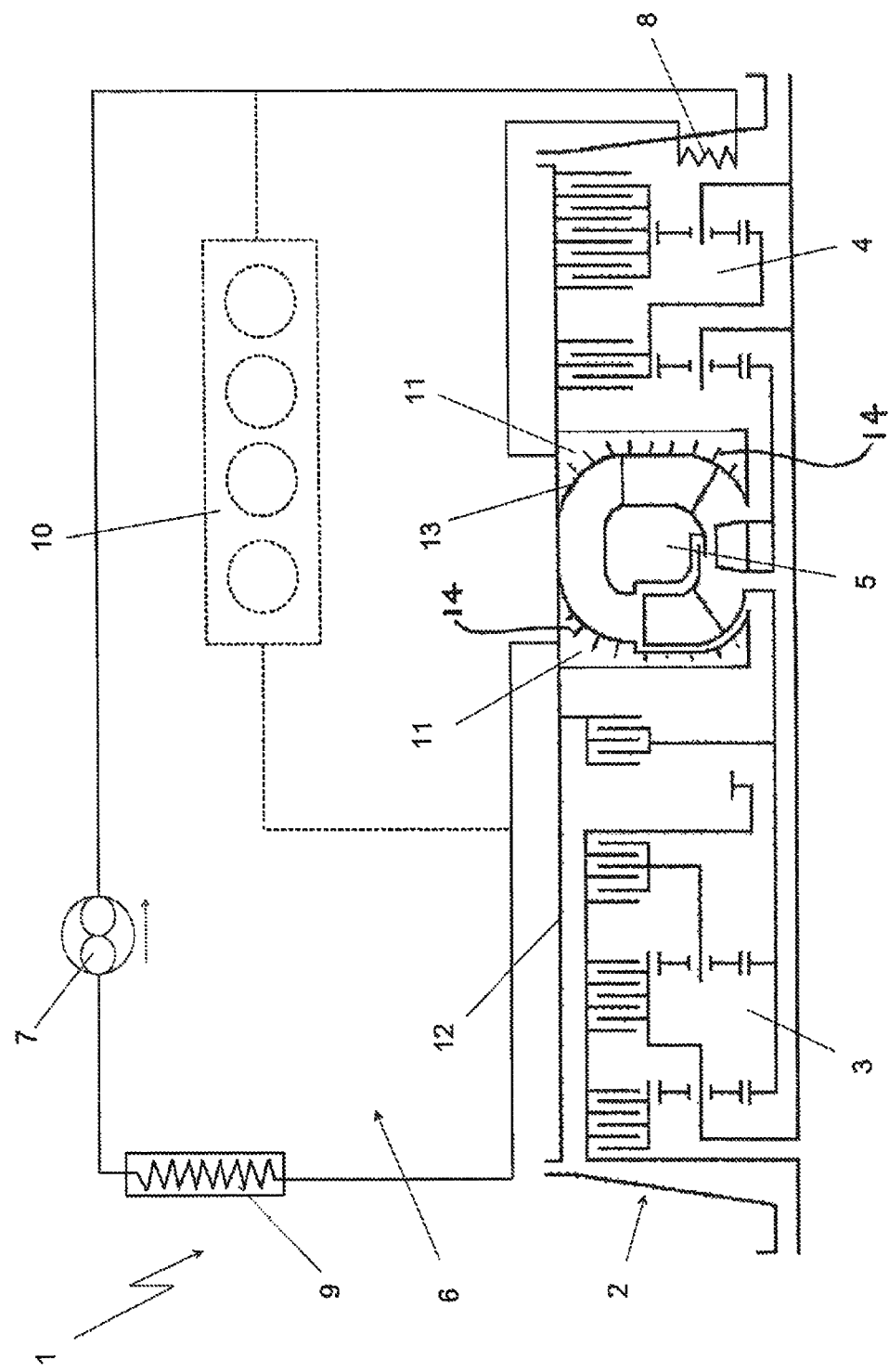

DRIVE DEVICE FOR A VEHICLE

The invention relates to a drive device for a vehicle, having an automatic transmission, which has a hydrodynamic torque converter.

Drive devices according to the species are known from the general prior art. Typically, drive devices of this type comprise an automatic transmission and at least one drive unit. This drive unit will generally be an internal combustion engine, however, combinations of multiple drive units, such as hybrid drives having internal combustion engine and serial or parallel electric machines, are conceivable. The drive devices according to the species each have an automatic transmission, which in turn works with a hydrodynamic torque converter.

Automatic transmissions having hydrodynamic torque converters of this type are also referred to as differential torque converter transmissions. They are known, for example, from German Published Application 2 021 543. It is typical for automatic transmissions having hydrodynamic torque converters of this type that, in particular when starting in first gear, the force transmission occurs via the hydrodynamic torque converter and only occurs purely mechanically with increasing transmission ratio while bypassing the hydrodynamic torque converter. In such a transmission, there are thus force pathways both via the hydrodynamic torque converter and also purely mechanical force pathways around the hydrodynamic torque converter and combined force pathways, which may be laid out partially mechanically and partially via the hydrodynamic torque converter. The hydrodynamic torque converter plays a special role when starting a motor vehicle having a drive device of this type, as already noted, and when braking the vehicle, because the hydrodynamic torque converter may assume the role of a wear-free brake here.

Both when starting and also when braking a vehicle having a drive device according to the species, friction losses occur in the hydrodynamic torque converter, which are manifested in the form of waste heat. This waste heat is dissipated via the transmission oil located in the automatic transmission, which is simultaneously used as the operating medium for the hydrodynamic torque converter, and discharged via a heat exchanger in the oil sump of the automatic transmission to the cooling medium.

This configuration has the disadvantage that only specific quantities of heat may be dissipated using the transmission oil, because predetermined maximum temperatures cannot be exceeded due to the thermal strain of the transmission oil, without damage to the transmission oil possibly occurring. An increase of the quantity of heat discharged via the oil may thus only be achieved by an increase of the volume flow, the delivery quantity, or the flow velocity of the oil through the cooling heat exchanger. However, all of these measures require larger amounts of oil or corresponding amounts of energy to provide the required boundary conditions in regard to volume and flow velocity of the oil volume flow in the heat exchanger.

In addition, the dissipation of the quantity of heat from the automatic transmission may no longer be sufficiently ensured in the event of rising temperature of the cooling medium, because the differential temperature between the cooling medium in the heat exchanger and the maximum possible temperature of the transmission oil thus becomes less and the transferred quantity of heat thus decreases.

It is therefore the object of the present invention to provide a drive device which makes improved cooling possible.

Through the additional apparatuses for the direct cooling of the hydrodynamic torque converter, according to the invention, two possibilities now result for dissipating heat from the automatic transmission, namely via the operating medium of the hydrodynamic torque converter, i.e., the transmission oil, on the one hand, and via direct cooling of the hydrodynamic torque converter, on the other hand. Because the highest temperatures arise and thus the highest quantity of waste heat occurs both when starting and also when braking in the hydrodynamic torque converter itself, especially targeted and efficient cooling in the area of the highest temperature in the automatic transmission may be achieved by the direct cooling of the hydrodynamic torque converter. Furthermore, due to the high temperature in the area of the hydrodynamic torque converter, an especially great temperature difference to the cooling medium results, so that especially efficient cooling may be implemented in this area.

A further advantage must be seen in that, by the direct cooling of the hydrodynamic torque converter, the maximum temperatures of the operating medium occurring therein are limited. Higher performances may thus be achieved in the hydrodynamic torque converter both when starting and also when braking. Because the heat arising in the hydrodynamic torque converter is distributed uniformly to the operating medium and the cooling medium, the temperature of the operating medium may thus be limited, so that thermal decomposition in the operating medium may simultaneously be prevented or reduced.

Because the hydrodynamic torque converter is the main heat source in the automatic transmission, direct cooling of the hydrodynamic torque converter is especially effective, because it acts directly at the point of the highest heat introduction in practically all operating states.

In addition, in an automatic transmission having hydrodynamic torque converter, thermal stresses frequently occur in the material of the transmission, because very large temperature jumps may occur between the individual areas of the transmission due to strong temperature variations in the operating medium, in particular when starting. In particular when starting using a still comparatively cold transmission, these differing temperatures in the individual areas of the transmission may result in extremely high stresses in the materials, which expand by different amounts. Temperature variations of this type may be significantly reduced by the efficient cooling of the operating medium in the area of the hydrodynamic torque converter, in particular when starting, so that a more homogeneous temperature curve is made possible in the operating medium and thus also in the entire automatic transmission. Through this chronologically and locally more homogeneous temperature curve, the mechanical stresses occurring in the automatic transmission because of the differing thermal expansions in the materials are significantly reduced. This in turn allows simpler and easier design of the transmission or a greater service life thereof.

According to an especially advantageous design of the drive device according to the invention, the apparatuses for the direct cooling of the hydrodynamic torque converter are implemented as heat exchangers in the area of the non-rotating elements of the torque converter. These elements, in particular the torque converter housing and the stators, which do not rotate in relation to the housing of the automatic transmission, are especially suitable to be cooled directly, because they may be supplied easily with a liquid cooling medium via corresponding lines.

In an especially advantageous refinement of this idea, the apparatuses for the direct cooling of the hydrodynamic torque converter are implemented in the form of at least partially hollow components of the torque converter, which are permeable by the cooling medium. This design of the torque converter housing or the stator ring having partially hollow or double-walled elements, for example, thus integrates the cooling heat exchanger directly in the hydrodynamic torque converter, in order to be able to cool it directly. Thus, on the one hand, the cooling performance may be significantly improved and, on the other hand, a construction may be achieved which has a minimal additional outlay for parts and installation space in relation to the typical construction. According to a very favorable refinement of the drive device according to the invention, the areas of the hydrodynamic torque converter in contact with the cooling medium have elements which make the heat transfer to the cooling medium easier. These elements may advantageously be implemented as heat baffles or heat conduction ribs, which enlarge the surface in contact with the cooling medium.

Alternatively or additionally, according to an advantageous refinement, structural elements may be provided, which shape the surface which the cooling medium flows over so that the flow of the cooling medium is turbulent.

A turbulent flow of this type has the advantage in relation to a laminar flow that the heat transfer from the surface to the flowing cooling medium is significantly improved. Therefore, by structures of this type on the surface, an improvement of the heat transfer and thus an improvement of the cooling performance may be achieved.

According to an especially favorable design of the drive device according to the invention, only a single cooling loop is provided for cooling the heat exchanger for the operating medium and for the direct cooling of the hydrodynamic torque converter. This one cooling loop for the cooling of the hydrodynamic torque converter and the operating medium, i.e., the transmission oil, has the advantage that the typical elements for a cooling loop such as regulating valves and conveyance apparatus only have to be provided once to maintain the volume flow of the cooling medium.

According to a corresponding refinement of this idea, the two heat sources in the cooling loop may be interconnected in the cooling loop in parallel or, in an alternative embodiment, also serially. In case of a serial interconnection, is advantageous if the cooling medium firstly permeates the heat exchanger for the operating medium, before it assumes the direct cooling of the hydrodynamic torque converter. As already noted at the beginning, the hydrodynamic torque converter is typically the area of the automatic transmission in which the largest quantity of heat occurs, so that the temperature in the area of the hydrodynamic torque converter will be higher than in the area in which the operating medium is cooled. A serial interconnection in the above-mentioned sequence thus ensures that in spite of minimal outlay in the cooling loop, good cooling of both the transmission oil and also the hydrodynamic torque converter may be achieved.

A design of the drive device according to the invention, in which it also comprises at least one drive unit, is especially advantageous if the cooling loop for the heat exchanger of the operating medium and the direct cooling of the hydrodynamic torque converter additionally comprises the cooling of the drive unit.

In this construction, in which only one cooling loop is needed for the complete drive device, the outlay for designing the cooling loop may be minimized. Typically, it will only have one coolant delivery pump, which conducts the coolant through the two heat exchangers and also through the heat exchanger of the drive unit, and then, in a cooling heat exchanger, ensures cooling of the cooling medium, for example, by the travel wind of a vehicle.

In practice, this means that the direct cooling of the hydrodynamic torque converter may additionally be integrated in the existing standard cooling loop, which typically has a mixture of water and antifreeze as the coolant, in order to be able to cool using a simple, frost-proof cooling medium, which has a high heat capacity.

Furthermore, it is provided in a further design of the drive device according to the invention that the supply lines for the coolant to the apparatuses for the direct cooling of the hydrodynamic torque converter are integrated in a housing of the automatic transmission.

This construction has the advantage that the automatic transmission per se may remain practically unchanged in regard to installation space and external contour and, in addition, by the guiding of the cooling channels in the housing of the automatic transmission, this housing is additionally cooled at least in the area of the cooling channels. In addition, through a heat exchanger for the operating medium which is flanged onto the housing of the automatic transmission in the typical construction, the synergy effect of simple and effective line guiding through the housing and both heat exchangers results, for example, in the serial or parallel interconnection described above.

Further advantageous designs of the invention result from the following exemplary embodiment illustrated on the basis of the drawing.

The single appended FIGURE shows an exemplary drive device for a vehicle according to the invention.

A drive device 1 according to the invention is recognizable in the FIGURE. The essential component is an automatic transmission 2, which is systematically shown here in a sectional illustration so that only one half of the transmission, which is constructed as rotationally symmetric, is indicated. The automatic transmission 2 has an input cage 3 and an output cage 4. These are only shown for exemplary purposes here and may also comprise alternative embodiments in addition to the embodiments shown, in particular other coupling structures and/or a different number of brake or clutch elements or different numbers of planetary gear sets. A hydrodynamic torque converter 5 may be seen between the input cage 3 and output cage 4 in the automatic transmission 2. As is typical in automatic transmissions 2 having hydrodynamic torque converters 5, the hydrodynamic torque converter is used for force transmission in particular when starting in first gear and may additionally be used as a wear-free auxiliary brake. In addition to a force pathway via the hydrodynamic torque converter, which is used in particular in first gear and in reverse gear, the automatic transmission 2 has mechanical force pathways which conduct the forces through the automatic transmission 2 without also using the hydrodynamic torque converter 5.

The drive device 1 additionally shows a schematic cooling loop 6 having a conveyance apparatus 7 for a cooling medium. The cooling medium is circulated in the cooling loop using the conveyance apparatus 7 and may thus cool the transmission oil of the automatic transmission 2 in an oil sump (not shown in greater detail) in the area of a heat exchanger 8. The cooling of the cooling medium in the cooling loop 6 then occurs via a cooling heat exchanger 9, which is typically permeated by the travel wind in a vehicle, in order to cool down the cooling medium in the cooling loop 6. An illustration of elements for regulating the temperature and/or the volume flow, as well as further typical components of a cooling loop 6, was dispensed with here for simplification. Nonetheless, components/devices of this type may be present in the cooling loop 6, of course.

In addition, such a cooling loop 6 may also be used for cooling a drive unit 10 of the drive device 1, typically an internal combustion engine, which is optionally indicated here, in addition to cooling the transmission oil. The cooling medium in the cooling loop 6 will be coolant water and/or a coolant water/antifreeze mixture, as in typical cooling loops, which is very well suitable for disposing of the heat arising in the drive unit 10 and the automatic transmission 2 because of its high heat capacity. The drive unit 10 may be integrated parallel to the automatic transmission 2 in the cooling loop 6, as is shown here using the dashed line. Alternatively thereto it would also be conceivable, of course, to integrate the drive unit 10 serially to the automatic transmission 2 in the cooling loop 6.

As in the prior art, the cooling of the automatic transmission 2 is thus performed via the cooling of the transmission oil, which is simultaneously also used as an operating medium for the hydrodynamic torque converter 5. This cooling via the heat exchanger 8 in the oil sump for the operating medium of the automatic transmission 2 may only dissipate limited quantities of heat, however, and therefore only allows limited performances, which correspondingly introduce limited heat into the automatic transmission 2. In particular when starting, but also when braking, it would be desirable to be able to implement higher performances using the hydrodynamic torque converter 5, which would then result in a greater heat introduction into the transmission oil, however. The transmission oil would suffer very strongly from thermal decomposition and would correspondingly have to be changed very frequently.

Through the construction shown here, it is now possible, however, to additionally permeate heat exchangers 11 in the area of the hydrodynamic torque converter 5 using the cooling medium in the cooling loop 6. A direct cooling of the hydrodynamic torque converter 5 is thus possible. Through this direct cooling of the hydrodynamic torque converter 5, the heat introduction into the operating medium of the automatic transmission 2 may be correspondingly reduced and a more uniform and efficient cooling of the automatic transmission 2 may be implemented in precisely the area in which the greatest quantities of heat occur. The heat exchangers 11 as exemplary apparatuses for the direct cooling of the hydrodynamic torque converter 5 are integrated serially to the heat exchanger 8 in the oil sump in the cooling loop 6 in the exemplary embodiment shown here, however, it would also be conceivable to situate them parallel to the heat exchanger 8 and/or serial to the drive unit 10.

In the hydrodynamic torque converter 5 the heat exchangers 11 are preferably situated in the areas in which the hydrodynamic torque converter does not move in relation to a housing 12 of the automatic transmission 2. These are particularly the torque converter housing 13 and in the area of the fixed turbine stator. The heal exchangers 11, which are only indicated for exemplary purposes here, may be implemented in particular as a double-walled embodiment of the housing 13 and/or other fixed parts. In addition, heat dissipation, to the cooling medium may be improved by heat conduction ribs or baffles or a corresponding surface design of the areas over which the cooling medium flows, such heat conduction ribs, baffles and surface design shown schematically in the FIGURE and represented by reference numeral 14.

The supply of the cooling medium may occur comparatively simply through the housing 12 of the automatic transmission 2, because these parts of the hydrodynamic torque converter 5, which contain the heat exchangers 11, do not move in relation to the housing 12 and thus allow a direct connection of cooling lines through the housing 12. In addition, through the line guiding in the wall of the housing 12, a very simple and compact construction may be achieved, in which only a few connections for the cooling medium are needed on the transmission 2.

In particular, the supply and removal of the cooling medium may be performed so that, using an inflow opening and an outflow opening on the transmission housing 12 and/or a media distributor, both the heat exchanger 8 for cooling the transmission oil and also the heat exchanger 11 in the area of the hydrodynamic torque converter 5 may be permeated in parallel or in sequence. This construction allows a simple and compact transmission which is very simple to handle in particular during installation or during maintenance work, because all fluid connections may be concentrated in one area of the transmission, for example, in a fluid distributor.

The invention claimed is:

1. A drive device for a vehicle, having an automatic transmission which has a hydrodynamic torque converter, transmission oil of the automatic transmission being used as the operating medium for the hydrodynamic torque converter, comprising: a heat exchanger for cooling the operating medium; additional apparatus for the direct cooling of the hydrodynamic torque converter using a cooling medium; areas of the hydrodynamic torque converter which are in contact with the cooling medium having elements which promote heat transfer to the cooling medium; wherein the elements which promote the heat transfer to the cooling medium are implemented as heat baffles and/or heat conduction ribs.

2. The drive device according to claim 1, wherein the apparatus for the direct cooling of the hydrodynamic torque converter include heat exchangers in an area of non-rotating elements of the torque converter.

3. The drive device according to claim 2, wherein the apparatus for the direct cooling of the hydrodynamic torque converter includes at least partially hollow components of the torque converter which are permeable by the cooling medium.

4. The drive device according to claim 2, including a joint cooling loop for the cooling of the heat exchanger for the operating medium and for the direct cooling of the hydrodynamic torque converter.

5. The drive device according to claim 1, wherein the apparatus for the direct cooling of the hydrodynamic torque converter include at least partially hollow components of the torque converter, which are permeable by the cooling medium.

6. The drive device according to claim 5, including a joint cooling loop for the cooling of the heat exchanger for the operating medium and for the direct cooling of the hydrodynamic torque converter.

7. The drive device according to claim 1, wherein the elements which promote the heat transfer to the cooling medium include structural elements on a surface over which the cooling medium flows so that they ensure a turbulent flow in the cooling medium.

8. The drive device according to claim 1, wherein supply lines for the cooling medium to the apparatus for the direct cooling of the hydrodynamic torque converter are integrated in a housing of the automatic transmission.

9. The drive device according to claim 1, characterized in that the elements which promote the heat transfer to the cooling medium are implemented as structural elements on a surface which the cooling medium flows over so that they ensure a turbulent flow in the cooling medium.

10. The drive device according to claim 1, including a joint cooling loop for the cooling of the heat exchanger for the operating medium and for the direct cooling of the hydrodynamic torque converter.

11. A drive device for a vehicle, having an automatic transmission which has a hydrodynamic torque converter, transmission oil of the automatic transmission being used as the operating medium for the hydrodynamic torque converter, comprising: a heat exchanger for cooling the operating medium; additional apparatus for the direct cooling of the hydrodynamic torque converter using a cooling medium; a joint cooling loop for the cooling of the heat exchanger, for the operating medium and for the direct cooling of the hydrodynamic torque converter; wherein the cooling loop is implemented in such a way that the heat exchanger for the operating medium and the apparatus for the direct cooling of the hydrodynamic torque converter are serially permeable by the cooling medium.

12. The drive device according to claim 11, wherein the apparatus for the direct cooling of the hydrodynamic torque converter is situated in the flow direction of the cooling medium after the heat exchanger for the operating medium.

13. The drive device according to claim 12, wherein the cooling loop is permeated by water or a water/antifreeze mixture as the cooling medium.

14. The drive device according to claim 12, and including a drive unit, wherein the cooling loop for the apparatus for the direct cooling of the hydrodynamic torque converter and the heat exchanger for the operating medium additionally comprise cooling of the drive unit.

15. The drive device according to claim 11, wherein the cooling loop is implemented in such a way that the heat exchanger for the operating medium and the apparatus for the direct cooling of the hydrodynamic torque converter are permeable by the cooling medium in parallel.

16. The drive device according to claim 15, wherein the cooling loop is permeated by water or a water/antifreeze mixture as the cooling medium.

17. The drive device according to claim 15, and including a drive unit, wherein the cooling loop for the apparatus for the direct cooling of the hydrodynamic torque converter and the heat exchanger for the operating medium additionally comprise cooling of the drive unit.

18. The drive device according to claim 11, and including a drive unit, wherein the cooling loop for the apparatus for the direct cooling of hydrodynamic torque converter and the heat exchanger for the operating medium additionally comprise cooling of the drive unit.

19. The drive device according to claim 18, wherein the cooling loop is permeated by water or a water/antifreeze mixture as the cooling medium.

20. The drive device according to claim 11, wherein the cooling loop is permeated by water or a water/antifreeze mixture as the cooling medium.

* * * * *